United States Patent
Saito et al.

(10) Patent No.: US 6,300,561 B1
(45) Date of Patent: Oct. 9, 2001

(54) FLEXURE ABSORBING STRUCTURE FOR WIRE PROTECTOR

(75) Inventors: Satoshi Saito; Tomohiro Ikeda, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/695,948

(22) Filed: Oct. 26, 2000

(30) Foreign Application Priority Data

Oct. 29, 1999 (JP) .................................................. 11-308919

(51) Int. Cl.[7] ....................................................... H02G 3/10
(52) U.S. Cl. ............................ 174/48; 220/3.7; 52/220.3; 248/49
(58) Field of Search .................................. 174/48, 49, 50, 174/72 A; 220/3.6, 3.3, 3.7, 3.8, 3.94, 4.02; 52/220.1, 220.3, 220.5; 248/49

(56) References Cited

U.S. PATENT DOCUMENTS

| | | | |
|---|---|---|---|
| 5,918,837 | * | 7/1999 | Vicain ..................................... 248/49 |
| 5,954,301 | * | 9/1999 | Joseph et al. ......................... 248/68.1 |
| 6,005,187 | * | 12/1999 | Navazo .................................... 174/48 |
| 6,011,221 | * | 1/2000 | Lecinski et al. .................... 174/72 A |
| 6,019,323 | * | 2/2000 | Jette ........................................ 248/49 |
| 6,076,779 | * | 6/2000 | Johnson ................................... 248/49 |
| 6,140,584 | * | 10/2000 | Baldissara ............................. 174/68.3 |
| 6,168,122 | * | 1/2001 | Lobsiger et al. ..................... 248/68.1 |

FOREIGN PATENT DOCUMENTS 04-28722   3/1992   (JP) .
11-120986  4/1999   (JP) .

* cited by examiner

*Primary Examiner*—Dean A. Reichard
*Assistant Examiner*—Dhiru R Patel
(74) *Attorney, Agent, or Firm*—Armstrong, Westerman, Hattori, McLeland & Naughton, LLP

(57) ABSTRACT

In a wire protector 1, a pair of cut-outs 17 are formed in each of both side walls 8 of a protector body 2 so as to extend from an upper end 8*a* of the side wall 8 toward a bottom wall 10. An intermediate cut-out 19 extending from the bottom wall toward the upper end is formed between a pair of the cut-outs 17. The bottom wall is provided with an opening 14 which communicates with the intermediate cut-out 19. These cut-outs cooperate to constitute a flexible portion 9 in a substantially inverted U-shape on each of both the side walls. Chain walls 21 coupling both the side walls 8 are formed in the opening 14 in front and back of the cut-out 19. Below the cut-outs 17, are positioned front and back ends 13 of the opening 14. Upright ribs 24 for separating electric wires are provided on the bottom wall 10 at areas except the opening 14 and the chain walls 21. The wire protector 1 having the protector body 2 covered with a cover 3 is insert molded in resin material to constitute a part of a battery connecting plate.

5 Claims, 8 Drawing Sheets

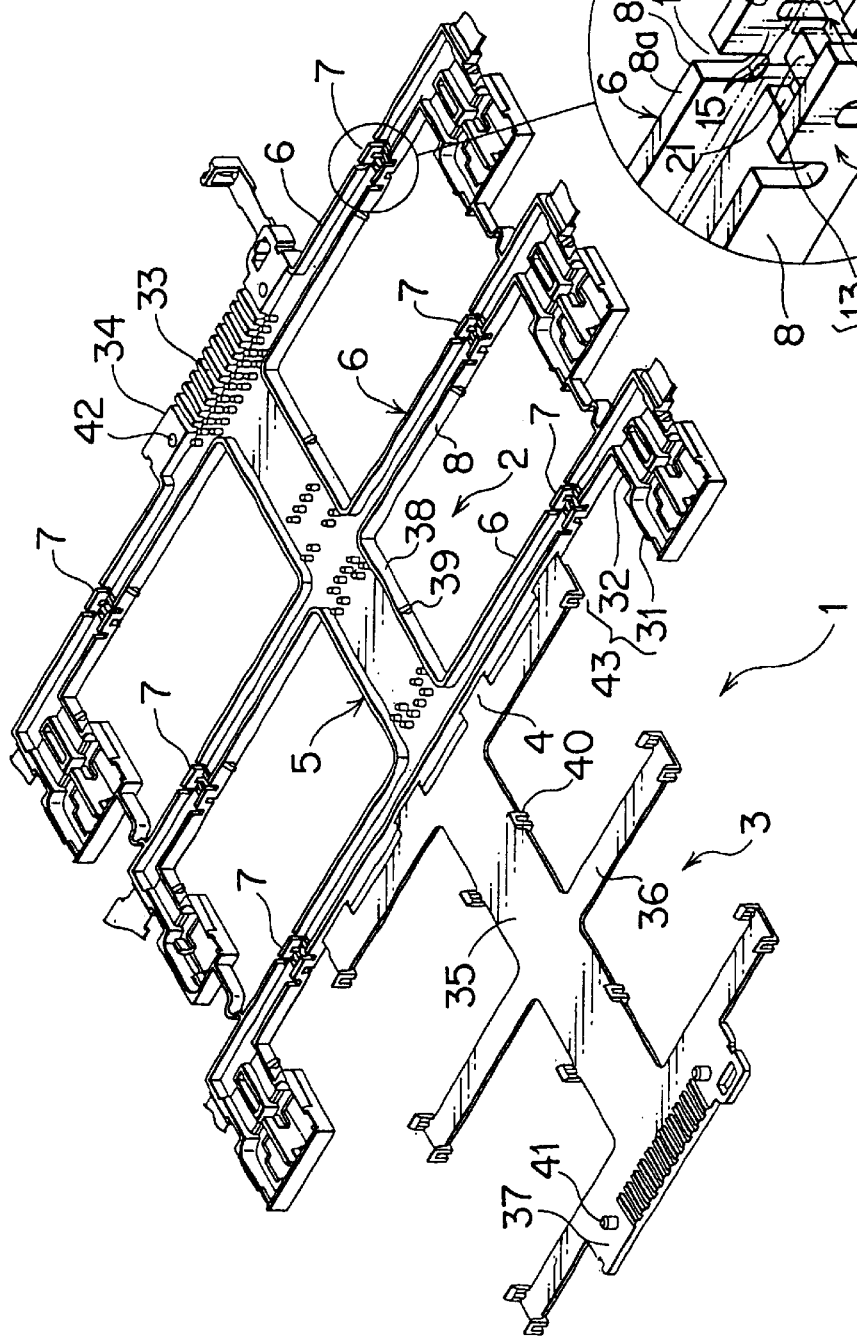
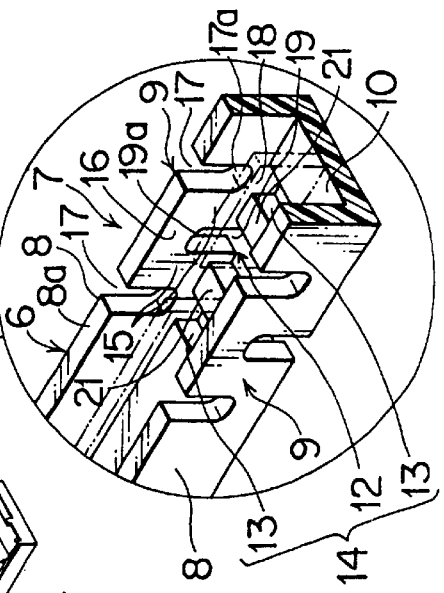
FIG.1A
FIG.1B

FLEXURE ABSORBING STRUCTURE FOR WIRE PROTECTOR

BACKGROUND OF THE INVENTION

1. Field of the Invention

The present invention relates to a flexure absorbing structure for an electric wire protector which can absorb positional misalignment occurring, for example, at insert molding in the electric wire protector which constitutes a part of a battery connecting plate for an electric car.

2. Description of the Related Art

FIG. 7 shows a conventional electric wire protector for protecting a wire harness which is disclosed in Japanese Utility Model Publication No. 4-28722 of Unexamined Application.

This wire protector 53 is formed of synthetic resin in a shape of trough, and provided with a plurality of notches 56 in parallel along both side walls 54 and an upper wall 55 to impart flexibility to the wire protector in a bending direction.

At front and rear ends of the wire protector 53, are provided fixing pieces 57. The wire protector 53 is bent following a crooked contour of a vehicle body or the like in a state where a wire harness (a plurality of electric wires) is passed through the wire protector 53, and then, fixed by means of the fixing pieces 57 with screws.

However, in the above described conventional structure, although the wire protector 53 can be deflected in the bending direction because of presence of the notches 56, expansion and contraction of the wire protector in a longitudinal direction are extremely poor because the top wall 55 is integral in the longitudinal direction.

FIG. 8 shows a wire protector to be used in a battery connecting plate for an electric car which is disclosed in Japanese Patent Publication No. 11-120986 of Unexamined Application. This wire protector 61 includes a plurality of electric wires 62 arranged in a desired shape and insert molded into the resin bodies 63.

The electric wires 62 are contained in a central main line part 64 and a plurality of branch line parts 65 which are branched to right and left from the main line part 64. The electric wires 62 in the main line part 64 are bundled into one and guided out to the exterior of the resin body 63. A terminal 66 is press-fitted to ends of the electric wires 62 in each the branch line part 65, and an electrical contact portion 67 of the terminal 66 in a shape of a square plate is exposed to the exterior of the resin body 63. A fuse connecting portion of the terminal 66 is exposed to the interior of a frame-like part 68 of the resin body 63.

A fuse (not shown) is connected to the fuse connecting portion in a later step of assembling, and the electrical contact portion 67 is connected to the electric wires 62 through the fuse. Into the electrical contact portion 67 is inserted one of electrodes 70 of a battery 69 (FIG. 10), while the electric wires 62 are connected to a voltage detector (not shown) in the exterior.

FIG. 9 shows a battery connecting plate 72 which includes a second resin body (resin material) 71 incorporating the above described wire protector 61 (FIG. 8) by insert molding.

The electric wires 62 of the main line part 64 are guided out to the exterior from one end of the resin body 71.

Bus-bars 90 formed of electro-conductive metal in a rectangular shape are overlapped on and connected to the electrical contact portions 67 of the voltage detecting terminals 66 (FIG. 8), and in this state, the insert molding is conducted.

Each of the bus-bars 90 is provided with two holes 73. The electrodes 70 of the batteries 69 (FIG. 10) of male screw type are respectively inserted into the holes 73 and screwed with nuts (not shown) to be connected. The two adjacent batteries 69 are connected in series by means of the bus-bar 90. The electrical contact portion 67 of the aforesaid terminal 66 (FIG. 8) is screwed together with a nut into one of the holes 73 of the bus-bar 90. Near one end of the battery connecting plate 72, is provided a bus-bar 74 having a single hole, and an electric wire (not shown) for power supply is connected to the bus-bar 74.

FIG. 10 shows a state wherein the above described battery connecting plate 72 is being connected to the electrode 70 at one end of the cylindrical battery 69, while another battery connecting plate 75 is being connected to the electrode 76 at the other end of the battery 69.

The battery 69 is contained in a holder 78 having a plurality of round holes 77, and in this state, the battery connecting plates 72, 75 are connected to both the electrodes 70, 76 and screwed with nuts. The holder 78 is fixed to the vehicle body by means of brackets 79 and bolts 80. The above described voltage detecting terminals 66 are arranged on the battery connecting plate 72, and the electric wires 62 are guided out to the exterior from the terminals 66.

However, since the above described conventional wire protector 61 (FIG. 8) is composed of hard resin bodies, when a resin body of the battery connecting plate in FIG. 9 is formed by two-color molding around the wire protector 61, the holes 73 of the bus-bars 90 and the terminals 66 of the wire protector 61 cannot be accurately aligned. Accordingly, there has been a fear that positioning accuracy of the terminals 66 may be deteriorated.

In view of the above, the applicant has proposed, in Japanese Patent Publication No. 12-123802 of unexamined application, a flexure absorbing structure for a wire protector as shown in FIG. 11.

The structure is so constructed that inwardly bent parts 83 in a V-shape are formed in longitudinally offset positions on both side walls 82 of a protector body 81 in a rectangular trough shape, and an opening 85 is formed in a bottom wall 84 of the protector body 81 in an area including both the bent parts 83 enabling the protector body 81 to be longitudinally expanded and contracted.

When the protector body 81 is pulled in directions of arrows x, the bent parts 83 are deflected outward in directions of arrows y to expand the protector body 81. On the other hand, when the protector body 81 is pressed, both the bent parts 83 are compressed to contract the protector body 81.

After the electric wires are arranged in the protector body 81, a cover (not shown) is closed. An obtained protector assembly is insert molded in a resin material as shown in FIG. 9, to complete a battery connecting plate.

However, because the bent parts 83 project into the protector body 81 through which the electric wires are to be passed, in the above described flexure absorbing structure for the wire protector, the electric wires interfere with the bent parts 83 when they are arranged in the protector body 81. Therefore, it has been a problem that workability of arranging the electric wires may be worsened. Moreover, in case where the protector body 81 is compressed to position the voltage detecting terminals when conducting the two-color molding of the resin, in order to form the battery connecting plate as shown in FIG. 9, there has been a risk that the electric wires may be clamped between the bent parts 83 and likely to be deformed or damaged.

Further, there has been a fear that the electric wires may be subjected to resin forming pressure during the two-color molding, and tend to protrude from the opening 85 in the bottom wall 84 of the protector body 81.

In view of the above described problems, it is an object of the invention to provide a flexure absorbing structure for a wire protector which can, of course, reliably correct a longitudinal positional misalignment of the wire protector at two-color molding, and in which electric wires can be easily arranged in a protector body, the electric wires are hardly deformed or damaged when the protector body is compressed, and the electric wires will not protrude from the protector body to the exterior even though they are subjected to resin molding pressure.

SUMMARY OF THE INVENTION

In order to attain the above described object, according to the present invention, there is provided a flexure absorbing structure for a wire protector which comprises a pair of cut-outs formed in each of both side walls of a protector body in a shape of a trough so as to extend from an upper end of the side wall toward a bottom wall of the protector body, and an intermediate cut-out formed between a pair of the cut-outs and extending from the bottom wall toward the upper end, the bottom wall being provided with an opening which communicates with the intermediate cut-out, a pair of the cut-outs and the intermediate cut-out cooperating to form a flexible portion in a substantially inverted U-shape on each of the side walls.

According to a second aspect of the invention, chain walls coupling both the side walls are provided in the opening in front and back of the intermediate cut-out.

According to a third aspect of the invention, front and back ends of the opening are positioned below a pair of the cut-outs.

According to a fourth aspect of the invention, upright ribs for separating electric wires are provided on the bottom wall at areas except the opening and the chain walls.

According to a fifth aspect of the invention, the wire protector having the protector body covered with a cover is insert molded in resin material to constitute a part of a battery connecting plate.

According to the first aspect of the present invention, the protector body can be easily expanded and contracted in a longitudinal direction by means of the flexible portions constituted by the three cut-outs, and accordingly, the positional misalignment in the wire protector in the longitudinal direction can be easily and reliably corrected. Moreover, since the flexible portions exist in the same plane with the side walls, there is no bothering projection in the protector body. Therefore, passing and wiring works of the electric wires can be easily performed, and the electric wires are not pressed when the protector body is compressed or bent, hence protecting the electric wires from deformation or damages.

According to a second aspect of the present invention, the chain walls coupling both the side walls which are provided in the opening in the bottom will prevent the electric wires from jumping out. Since the chain walls are connected to both the side walls, the electric wires will not jump out even when a strong force is applied to the wires.

According to a third aspect of the invention, in an area between a pair of the cut-outs and the front and back ends of the opening, the side walls are formed narrower, the protector body can be imparted with flexibility in a bending direction. Thus, positional misalignment not only in the expanding and contracting direction but in the bending direction can be easily adjusted. The positional misalignment in the bending direction can be also adjusted by a middle part of the inverted U-shaped flexible portion, and bending performance of the protector body can be further enhanced.

According to a fourth aspect of the invention, separation of the electric wires can be facilitated. In addition, since the upright ribs are provided at the areas except the opening and the chain walls, the bending performance of the protector body can be assured.

According to a fifth aspect of the invention, in case where the wire protector is insert molded with positional misalignment in a longitudinal direction, the flexible portions can absorb the positional misalignment. The positional accuracy of the wire protector in the battery connecting plate after the insert molding will be thus enhanced. Moreover, even in case where the electric wires are subjected to strong resin molding pressure during the insert molding, the chain walls will reliably prevent the electric wires from jumping out from the opening.

BRIEF DESCRIPTION OF THE DRAWINGS

FIG. 1A is an extensive perspective view showing one embodiment of a flexure absorbing structure for a wire protector according to the present invention, and FIG. 1B is a magnified perspective view of one flexure absorbing part of the flexure absorbing structure shown in FIG. 1A;

DESCRIPTION OF THE PREFERRED EMBODIMENTS

Figure 2:
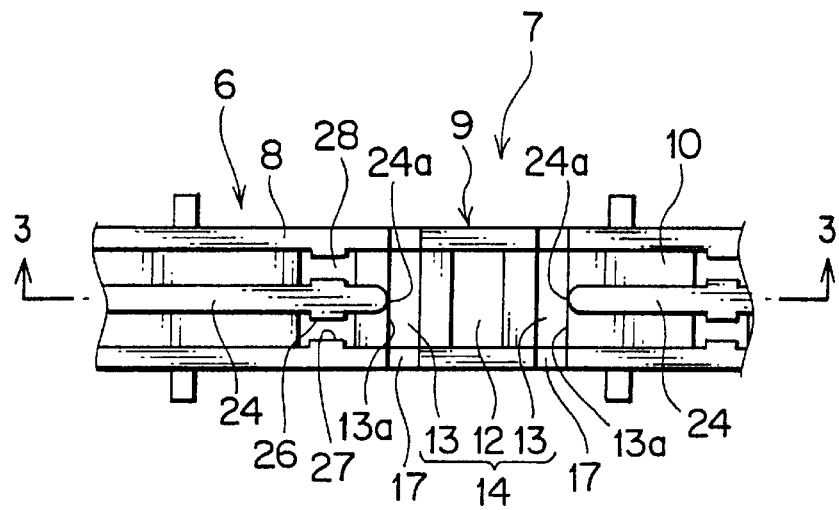
FIG. 2 is a plan view showing a flexure absorbing part of a protector body.

Now, the present invention will be described in detail by way of examples referring to the attached drawings.

FIGS. 1A and 1B show one embodiment of a flexure absorbing structure for a wire protector according to the present invention.

A wire protector 1 consists of a protector body 2 of synthetic resin, and a cover 3 integrally formed with the protector body 2 by way of a thin walled hinge portion 4. The protector body 2 includes a main line passing part 5 and a plurality of branch line passing parts 6 intersecting the main line passing part 5 at right angle. A flexure absorbing part 7 is provided on each of the branch line passing part 6 in the middle part in a longitudinal direction.

Figure 3:
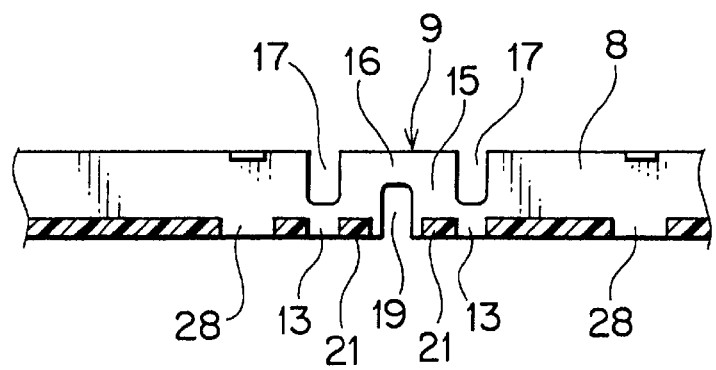
FIG. 3 is a cross sectional view of the flexure absorbing part taken along a line 3—3 of FIG. 2.

As shown in FIGS. 1 to 3, the flexure absorbing part 7 is constructed in such a way that flexible portions 9 in an inverted U-shape are formed on both side walls 8 of the branch line passing part 6, and an opening 14 corresponding to the flexible portions 9 is formed in a bottom wall 10 of the branch line passing part 6. The flexible portions 9 face with each other on both the side walls 8.

Each of the flexible portions 9 consists of vertical chain walls 15 on both sides and a horizontal chain wall 16 coupling upper ends of both the chain walls 15. On both front and back sides of the flexible portion 9 (front and back of the branch line passing part 6 in a longitudinal direction) are formed cut-outs 17 in a shape of a rectangular slit which extend downward from an upper end 8a of the side wall 8. The inverted U-shaped flexible portion 9 is located between a pair of the cut-outs 17. A pair of the cut-outs 17 extend up to a rather upper part of an inner face of the bottom wall 10, forming narrow chain walls 18 between an outer face of the bottom wall 10 and bottom faces 17a of the cut-outs 17.

In the middle of the flexible portion 9 between a pair of the cut-outs 17, is formed another cut-out 19 in a shape of a rectangular slit which extends upward from the outer face of the bottom wall 10. The cut-out 19 extends from the outer face of the bottom wall 10 close to the upper end 8a of the side wall 8 forming the aforesaid narrow chain wall 16 between the upper face 19a of the cut-out 19 and the upper end 8a of the side wall 8.

The three cut-outs 17, 19 have substantially the same length and substantially the same width. The two chain walls 15 also have substantially the same width. The three cut-outs 17, 19 are staggeredly arranged in a longitudinal direction of the branch line passing part 6. The cut-outs 17, 19 extend in a vertical direction.

The opening 14 in the bottom wall 10 consists of a central opening 12 and two openings 13 on front and back sides in the longitudinal direction of the branch line passing part 6. The central opening 12 communicate with the intermediate cut-out 19 and formed wider than the cut-out 19. Adjacent to both front and back sides of the opening 12, are formed a pair of horizontal chain walls 21 which are in an elongated rectangular shape and narrower than the vertical chain wall 15 of the flexible portion 9. Each of the chain walls 21 is a part of the bottom wall 10 and couples the side walls 8 in a traversing direction. The chain walls 21 are rather apart in back and forth directions from the intermediate cut-out 19.

Outside a pair of the chain walls 21 in backward and forward directions, are formed narrow rectangular openings 13 in the bottom wall 10. The openings 13 have substantially the same width as the cut-outs 17. Outside both the openings 13, there continues the bottom wall 10. The chain wall 21 and the openings 12, 13 extend in a traversing direction of the branch line passing part 6.

The above described structure can be recognized as such that a large opening including the central opening 12 and both the front and back openings 13 is previously formed, and the chain walls 21 for coupling both the side walls 8 are provided in front and back of the intermediate cut-out 19. Below a pair of the cut-outs 17, are positioned the small openings 13 which are front and back ends of the large opening.

Figure 4:
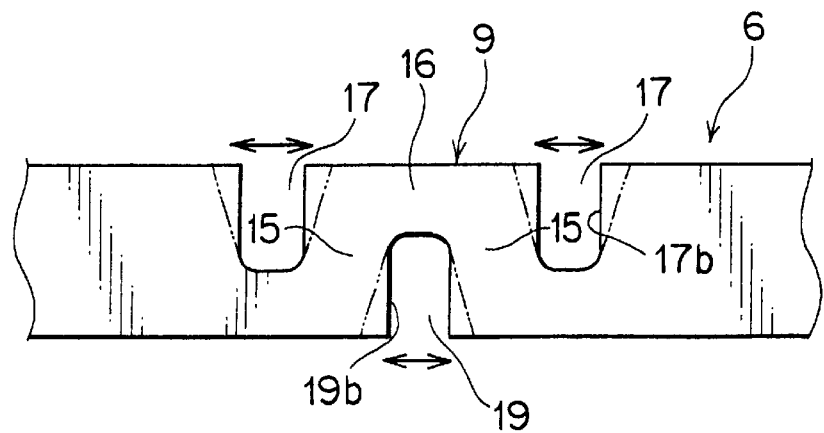
FIG. 4 is an explanatory view showing function of the flexure absorbing part.

As shown in FIG. 4, when tensile forces in a longitudinal direction are applied to the branch line passing part 6, the three cut-outs 17, 19 in the front, back and center of the branch line passing part 6 in a longitudinal direction are respectively widened in a substantially V-shape and a substantially inverted V-shape. A pair of the chain walls 15 of the flexible portion 9 are inclined and expanded in the pulled directions. The branch line passing part 6 can be easily and reliably expanded in this manner.

When compressive forces are applied to the branch line passing part 6, the three cut-outs 17, 19 are crushed in a widthwise direction allowing respective inner side faces 17b, 19b which face with each other to be brought in contact. The cut-outs 17 on both the front and back sides are crushed in a substantially inverted V-shape and the intermediate cut-out 19 is crushed in a substantially V-shape. At the same time, the horizontal chain wall 16 of the flexible portion 9 is deflected so as to protrude longitudinally upward of the intermediate cut-out 19 and absorbs the compressive force. The branch line passing part 6 can be easily and reliably compressed through these actions.

The above described actions can be realized by the presence of the central opening 12 in the bottom wall 10. The front and back openings 13 serve to bend the branch line passing part 6 easily around the flexible portions 9, when upward and downward bending forces are applied to the branch line passing part 6.

The front and back chain walls 21 on the bottom wall 10 are useful for preventing electric wires 23 (FIG. 6) from jumping out from the opening 14. An inner width of the openings 12, 13 is preferably set in such a size that the electric wire 23 may not jump out, that is, about a double of an outer diameter of the electric wire 23.

Figure 6:
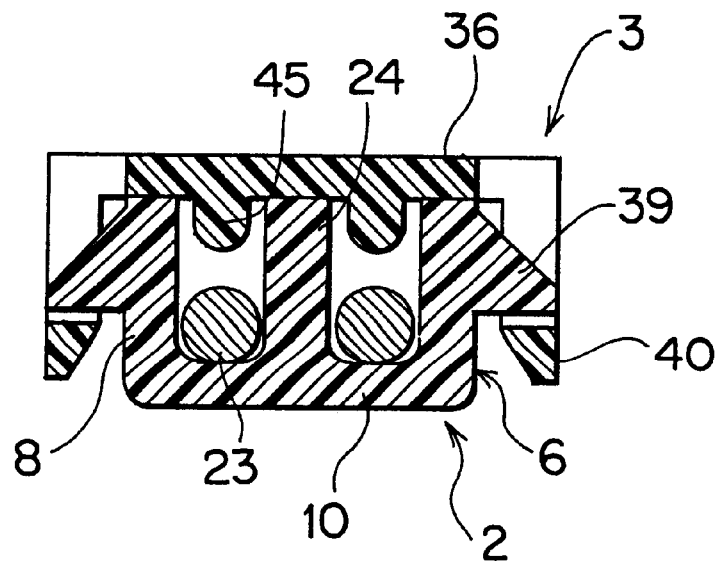
FIG. 6 is a cross sectional view taken along a line 6—6 of FIG. 5.
Figure 7:
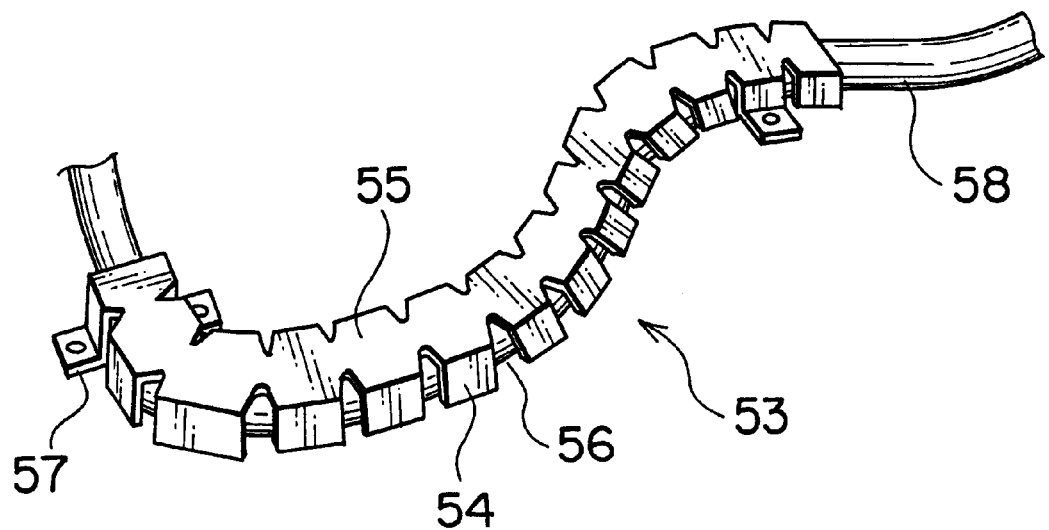
FIG. 7 is a perspective view showing one example of conventional wire protectors.
Figure 8:
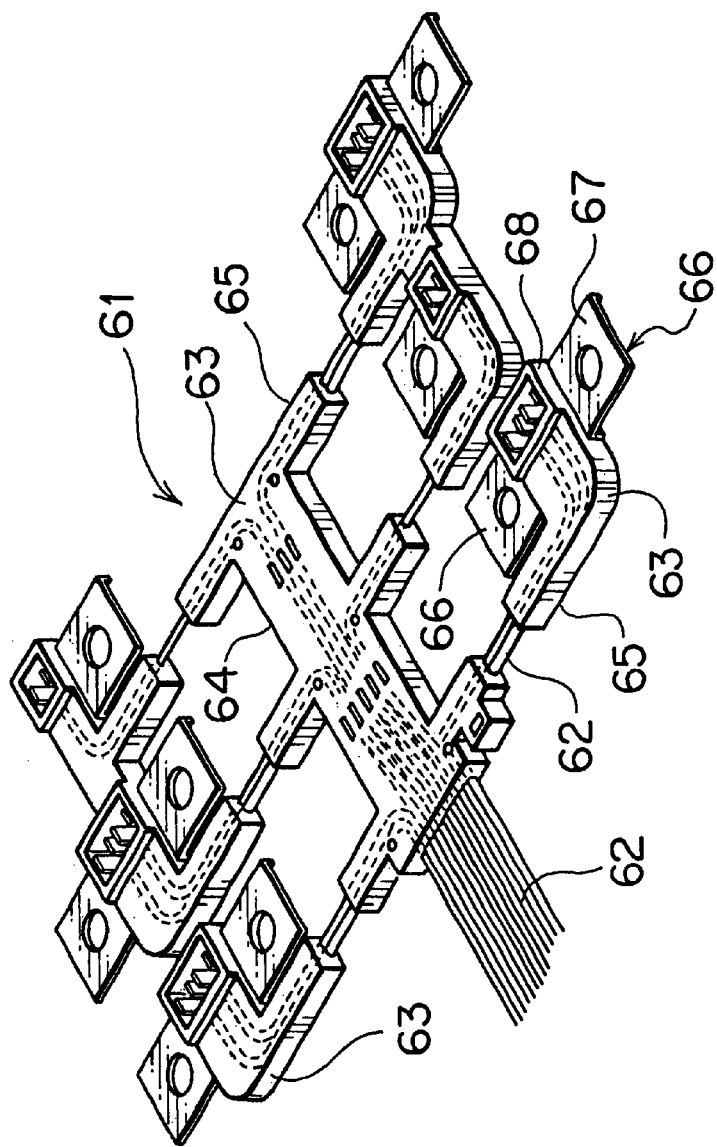
FIG. 8 is a perspective view showing another example of the conventional wire protectors.

Further, ribs 24 for separating the electric wires are uprightly formed in the center of the bottom wall 10 of the branch line passing part 6 except the flexure absorbing part 7 as shown in FIGS. 2 and 6. Ends 24a of the ribs 24 are located at outer side ends 13a of the front and back openings 13. The rib 24 is provided with projections 26 for holding the electric wire, and similar projections 27 are formed on the side walls 8 facing with the projections 26. The bottom wall 10 is provided with a hole 28 for mold extraction at resin molding, below the projections 27.

Figure 5:
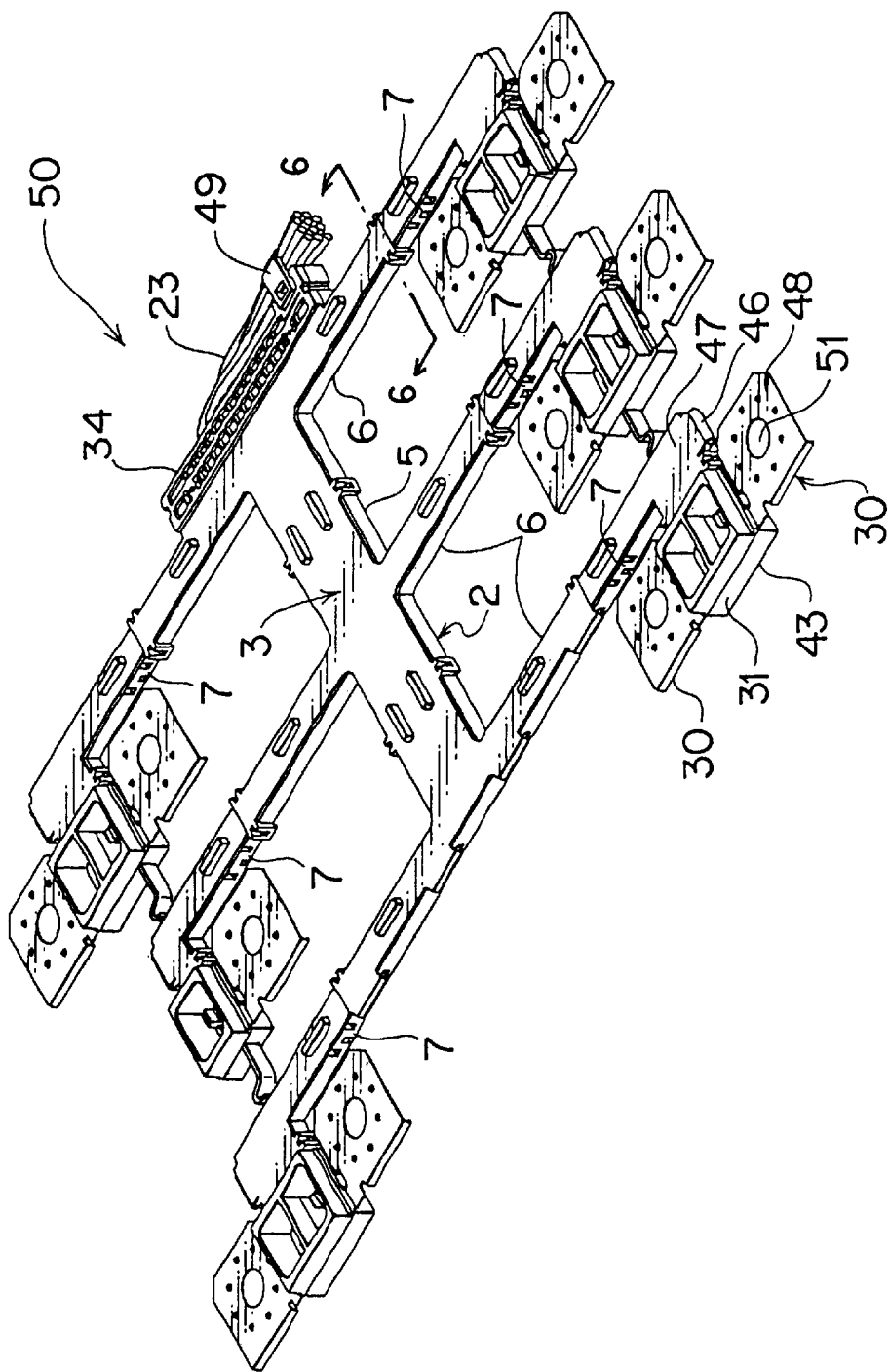
FIG. 5 is a perspective view showing a wire protector assembly with a cover closed.

Referring back to FIGS. 1A and 1B, at each end of the branch line passing part 6 is formed a frame-like portion 31 for containing a fuse connecting part (not shown) of a voltage detecting terminal 30 (FIG. 5). A trough-like portion 32 for containing an electric wire press-fitting portion (not shown) of the terminal 30 is formed adjacent to the frame-like portion 31. The structure except the flexure absorbing part 7 is the same as the one which has been previously proposed by the applicant in Japanese Patent Publication No. 12-123802 of the unexamined application.

The branch line passing part 6 at the forward end is provided with a wire guiding part 34 having a plurality of grooves 33 for guiding out the electric wires so as to project in an extending direction of the main line passing part 5. The branch line passing part 6 at the backward end is integrally formed with the cover 3 of synthetic resin by way of the thin-walled hinge 4.

The cover 3 includes a wide portion 35 for covering the main line passing part 5, a narrow portion 36 for covering the branch line passing parts 6, and a flange portion 37 for covering the wire guiding part 34. Locking projections 39 are formed on outer faces of the side walls 8, 38 of the protector body 2, and locking frame pieces 40 corresponding to the locking projections 39 are formed on the cover 3. The flange portion 37 for covering the wire guiding part 34 is provided with positioning pins 41, and the wire guiding part 34 is provided with engaging holes 42 corresponding to the positioning pins 41.

Figure 11:
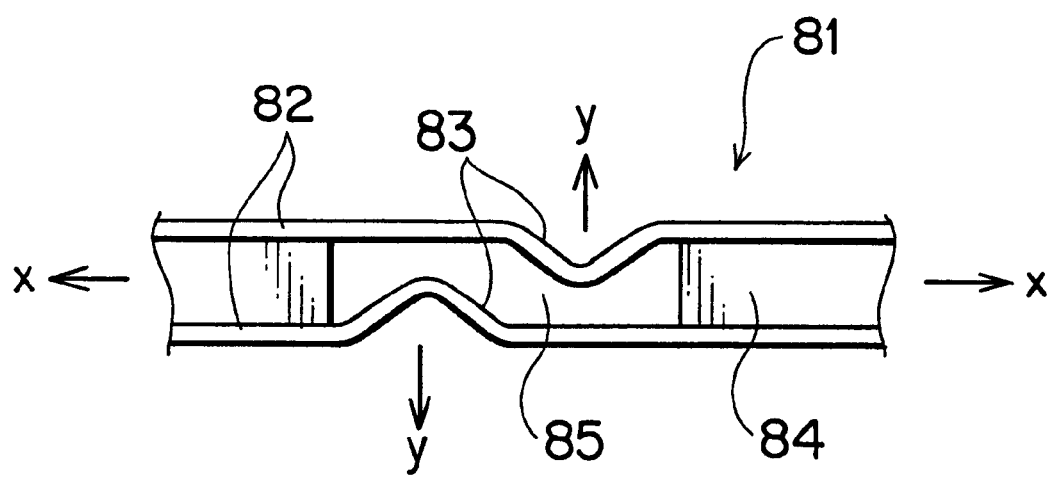
FIG. 11 is a plan view showing another example of the conventional wire protector.

The voltage detecting terminal 30 is contained in a terminal containing part 43 in a state where the electric wires are press-fitted to the terminal 30 (FIG. 5), the wires 23 (FIG. 6) are arranged in the main line passing part 5 through the branch line passing part 6, and guided out from the wire guiding part 34. Wiring of the electric wires 23 can be conducted smoothly because there is no flexure absorbing projection as in the conventional case (FIG. 11) in the narrow branch line passing part 6.

After all the wires 23 are arranged in the protector body 2, the cover 3 is closed, as shown in FIG. 5, thereby to protect the wires 23 from interferences with the exterior or so. As shown in FIG. 6 in section taken along a line 6—6 of FIG. 5, the electric wires 23 are separated by means of the central rib 24 in the narrow branch line passing part 6, and overlapping of the wiring can be prevented. This will also improve wiring workability of the electric wires 23, the cover 3 includes wire holding pins or ribs 45 for retaining the wires and preventing the wires from jumping, the locking frame pieces 40 of the cover 3 are engaged with the locking projections 39 of the protector body 2.

FIG. 5, almost entire areas of the main line passing part 5 and the branch line passing parts 6 are covered with the cover 3. Tip end portions of the branch line passing parts 6 are covered with sub covers 47 (not shown in FIG. 1) which are connected to the terminal containing parts 43 by means of hinge portions 46. The above described flexure absorbing parts 7 are respectively opposed to the sub covers 47. The sub cover 47 may be preferably locked with the branch line passing parts 6 at positions apart from the flexure absorbing parts 7. Because the sub covers 47 and the main cover 3 are separated, the expanding and contracting actions of the flexure absorbing parts 7 will not be restrained by the main cover 3.

Electrical contact portions 48 of the voltage detecting terminal 30 in a shape of a square plate are arranged on both sides of the frame-like portion 31. The electric wires 23 are bent and guided from the wire guiding part 34, and fixed to the wire guiding part 34 by means of a band 49. Tip ends of the electric wires 23 are connected to a connector for a voltage detector (not shown).

Figure 9:
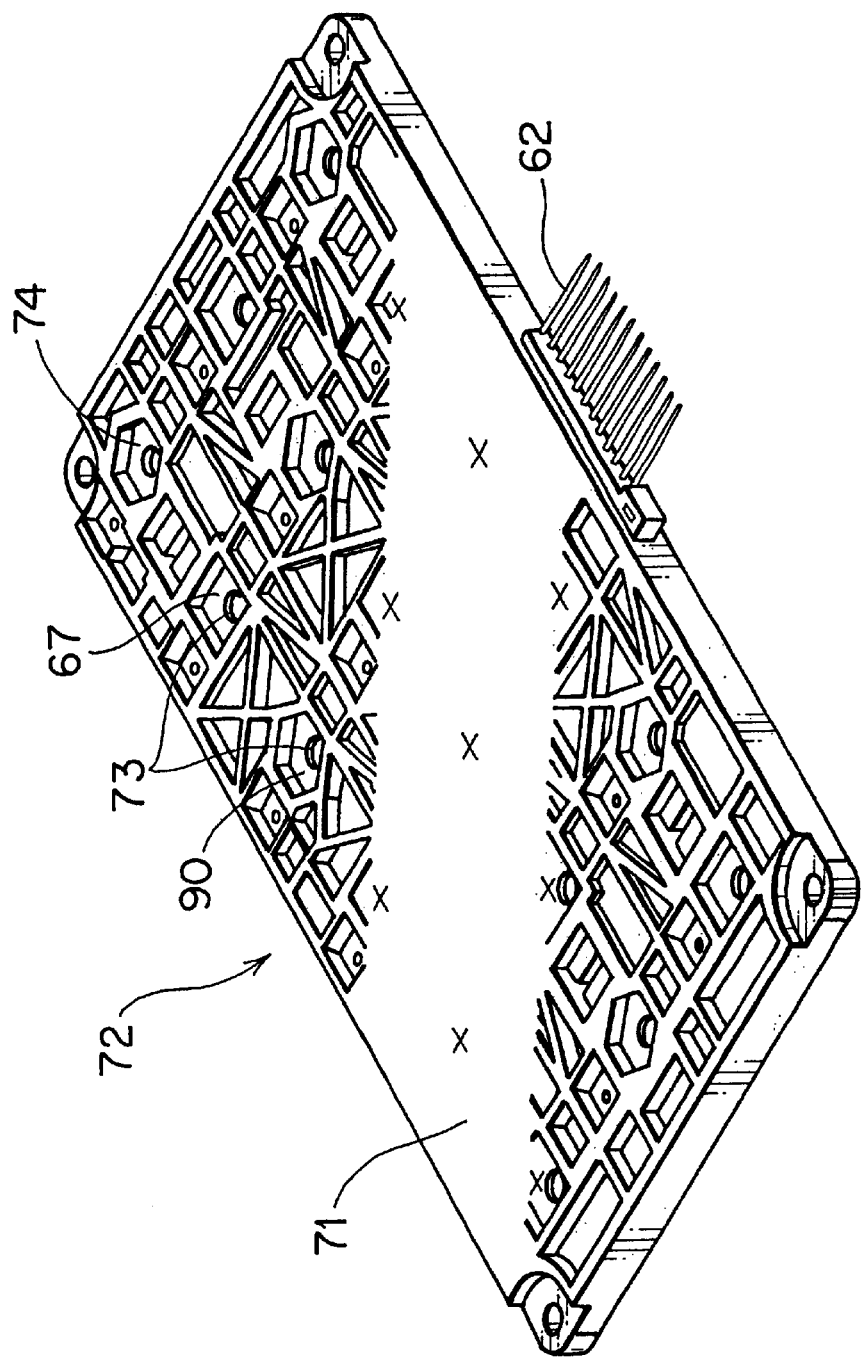
FIG. 9 is a perspective view showing a battery connecting plate including the conventional wire protector.
Figure 10:
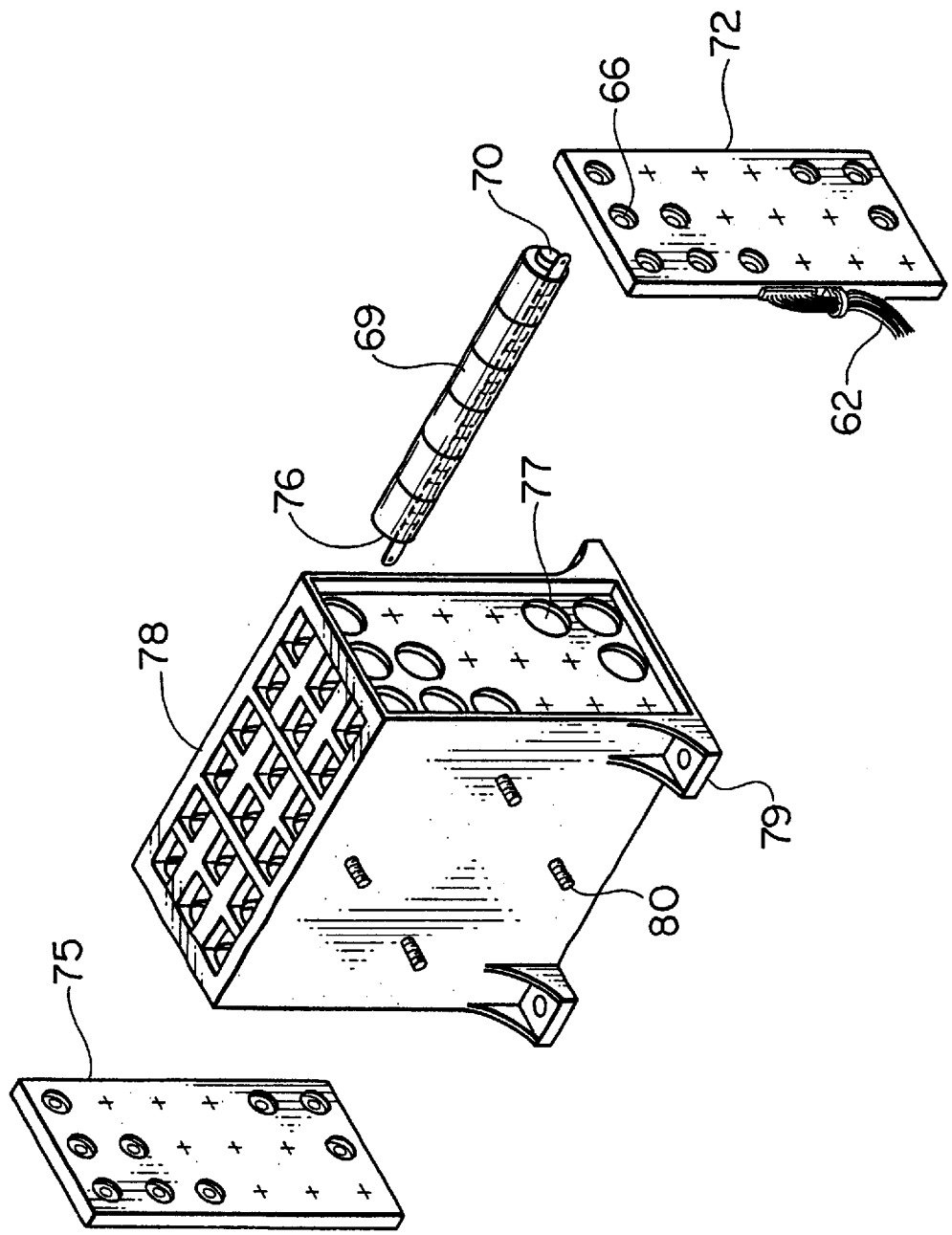
FIG. 10 is an exploded perspective view showing the battery connecting plate when used.

A wire protector assembly 50 as shown in FIG. 5 is set in a resin mold in order to mold a battery connecting plate in the same manner as the conventional case as shown in FIG. 9. On this occasion, in case where the holes 73 of the bus-bar 90 (FIG. 9) in the mold and holes 51 of the terminal 30 in the wire protector assembly 50 are not aligned, the flexure absorbing part 7 can easily and reliably expand and contract the branch line passing part 6. Therefore, the assembly 50 can be easily and reliably set in the mold (not shown), thereby to accurately position the bus-bar 90 of the battery connecting plate and the terminal 30.

It is to be noted that the above described structure employing the flexure absorbing part 7 can be applied not only to the wire protector 1 for the battery connecting plate but to the wire protector (not shown) for protecting a wire harness.

Although the present invention has been fully described by way of examples referring to the accompanying drawings, it is to be noted that various changes and modifications will be apparent to those skilled in the art.

What is claimed is:

1. A flexure absorbing structure for a wire protector which comprises;

a pair of cut-outs formed in each of both side walls of a protector body in a shape of a trough so as to extend from an upper end of said side wall toward a bottom wall of said protector body, and an intermediate cut-out formed between a pair of said cut-outs and extending from said bottom wall to said upper end, said bottom wall being provided with an opening which communicates with said intermediate cut-out, a pair of said cut-outs and said intermediate cut-out cooperating to form a flexible portion in a substantially inverted U-shape on each of said side walls.

2. The flexure absorbing structure for the wire protector as claimed in claim 1, wherein a chain wall coupling both said side walls is provided in said opening in front and back of said intermediate cut-out.

3. The flexure absorbing structure for the wire protector as claimed in claim 2, wherein front and back ends of said opening are positioned below a pair of said cut-outs.

4. The flexure absorbing structure for the wire protector as claimed in any one of claims 1 to 3, wherein upright ribs for separating electric wires are provided on said bottom wall at areas except said opening and said chain wall.

5. The flexure absorbing structure for the wire protector as claimed in any one of claims 1 to 4, wherein said wire protector having said protector body covered with a cover is insert molded in resin material to constitute a part of a battery connecting plate.

* * * * *